Patented July 31, 1923.

1,463,212

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PROCESS FOR THE MANUFACTURE OF CONCENTRATED ACETIC ACID.

No Drawing. Application filed December 15, 1922. Serial No. 607,201.

*To all whom it may concern:*

Be it known that I, HENRY HOWARD, a citizen of the United States, residing at Cleveland, in the county of Cuyahoga and State of Ohio, have invented certain new and useful Improvements in Processes for the Manufacture of Concentrated Acetic Acid, of which the following is a specification.

This invention relates to a process for the manufacture of acetic acid, and more particularly to a process for the direct production of acetic acid in concentrated form.

In order to give a clear understanding of applicant's invention it seems advisable to consider some of the prior processes for the manufacture of acetic acid. A common process for the manufacture of acetic acid consists in decomposing calcium acetate in a solution of a strong mineral acid, such as a solution of sulfuric or hydrochloric acid, and distilling acetic acid from the resulting reaction mixture. For example, calicum acetate is mixed with hydrochloric acid solution of say 22° Bé. in quantity sufficient to decompose the calcium acetate and liberate the corresponding quantity of acetic acid, and the reaction mixture is distilled, the distillation being completed by blowing live steam through the reaction mixture. The yield and quality of acetic acid obtained by this method are excellent, but the acetic acid solution obtained is weak, running for instance around 30% acetic acid. Attempts have been made to produce a stronger acetic acid product by using less water in the reaction mixture than is supplied thereto by a solution of hydrochloric acid of about 22° Bé. It has even been attempted to produce glacial acetic acid by treating dry calcium acetate with anhydrous hydrochrolic acid gas. Such attempts, however, have not been commercially successful, presumably because the reaction mixtures employed did not contain sufficient water to permit a sufficiently complete liberation of acetic acid by the interaction of the hydrochloric acid with the calcium acetate. When the water content of the reaction mixture is too limited the yield and quality of the acetic acid distillate are poor and an excessive amount of hydrochloric acid distils along with the acetic acid.

I have devised a process of making acetic acid in which a reaction mixture containing sufficient water to permit complete reaction is used, but in which the bulk of the water content of the reaction mixture is prevented from entering the acetic acid product. The process comprises decomposing acetate of lime with a solution of mineral acid containing sufficient water to permit the completion of reaction, distilling the reaction mixture, collecting a first strong acetic acid fraction which is set aside as the final product, and then collecting a second weak acetic acid fraction which is used as the reaction vehicle or solvent in a subsequent operation.

The process may be carried out in the following manner:

To start the process acetate of lime is dissolved in a solution of hydrochloric acid of the usual strength, say 22° Bé., in quantity sufficient to neutralize the acetate of lime and the reaction mixture is distilled, the distillate being collected in the first or earlier stage or stages of the distillation in the form of a solution of acetic acid of say 50 per cent or greater strength, and the distillate in the later stage of the distillation being separately collected in the form of a weak acetic acid solution of say 20 per cent strength or less.

The distillation is carried as far as is practicable by indirect heating and then is completed preferably by the continuation of the indirect heating in conjunction with the blowing of live steam through the reaction mixture. The use of direct steam is practically necessary in order to complete the recovery of acetic acid from the charge, but since the use of direct steam introduces water into the distillate, it should be limited so as to produce a dilute acetic acid solution containing only the quantity of water required in a subsequent batch. For the production of acetic acid of 50 per cent strength or more it is usually necessary to continue the distillation by indirect heat to the point at which the cut between the strong acetic acid product and the dilute acetic acid solution to be returned to the process is made, and in order to avoid the introduction of too much water into the dilute acetic acid solution, it may be necessary to continue the distillation by direct heat beyond this point.

It will be apparent that instead of collecting only one strong and one weak acetic acid fraction from the distillation, the distillates may be collected in any desired number of fractions ranging from the strongest acid produced at the beginning of the distillation to the weakest acid produced at the end of the distillation.

The weak acetic acid solution collected in the later stage or stages of the first distillation is used to supply wholly or in part the solvent for a second batch of acetate of lime and hydrochloric acid gas. The weak acid may be used in several ways. For instance, it may be used as the absorbing liquid for hydrochloric acid gas in the usual hydrochloric acid absorbing towers in place of water, thus producing a solution of hydrochloric acid and acetic acid in water containing substantially the same relative proportions of water and hydrochloric acid, as for instance, the 22° Bé. hydrochloric acid used in the first operation. This solution is then used in place of the pure hydrochloric acid solution in treating a subsequent batch of acetate of lime.

Or the dilute acetic acid solution obtained in the later stage of the first distilling operation is used to dissolve a batch of acetate of lime, and then hydrochloric acid gas sufficient to react with the acetate of lime is absorbed in the solution. This operation should be carried out in apparatus provided with means for cooling the mixture in order to prevent overheating by the heat of reaction and loss of acetic acid.

Thus in either case, that is, when the dilute acetic acid solution is used to prepare the solution of hydrochloric acid for the treatment of the acetate of lime, or when the dilute acetic acid is used to dissolve the acetate of lime and hydrochloric acid gas is dissolved in the resulting solution, the mixture of acetate of lime, hydrochloric acid, and acetic acid and their reaction products so prepared contains the same relative quantities of water, hydrochloric acid and calcium acetate as when the mixture is prepared from pure hydrochloric acid solution of about 22° Bé., and in addition it contains the acetic acid present in the dilute solution of acetic acid employed.

The reaction mixture prepared as described is then distilled and separate portions of strong acetic acid and weak acetic acid collected. However, in this distillation the amount of strong acetic acid solution of a given strength collected will be augmented to substantially the extent of the amount of acetic acid added to the reaction mixture in the form of weak acetic acid solution from the first distillation. The portion of weak acetic acid solution collected is of about the same strength and in about the same quantity as the weak acetic product of the first distillation. The weak acetic acid from the second distillation is used in a third repetition of the procedure, the weak acid from the third procedure in a fourth procedure and so on. Thus only the strong acetic acid distillate appears as a final product of the process, the weak acid formed being used in the process.

It need not of course be assumed that the process is started with hydrochloric acid solution of 22° Bé. Acetic acid solution obtained from some other source may be used in the first distilling operation, thus producing the relatively higher yield of strong acetic acid solution from the start of the process.

As is explained above, each batch of acetate of lime and hydrochloric acid prepared for distillation is made to contain the quantity of water necessary to insure good yields of acetic acid, that is, sufficient water to hold the calcium chlorid formed by the reaction in solution, but instead of supplying a new quantity of water for each batch in the form of a dilute hydrochloric acid solution and distilling this water into the acetic acid product, the water content of each batch in excess of that distilled with the strong acetic acid product is returned to the process.

In the foregoing description of a specific procedure in accordance with my invention I have referred to the use of hydrochloric acid solution of about 22° Bé. or a solution of hydrochloric acid and acetic acid in water containing about the same relative proportions of water and hydrochloric acid as a 22° Bé. solution of hydrochloric acid in water. Such solutions when used in the manner described, that is, with the cutting of the distillate into a first fraction of about 50 to 60 per cent strength and a second fraction of about 20 per cent strength and the use of indirect heating followed by limited direct steam distillation give satisfactory results. It will be understood, however, that the invention is not limited to the use of hydrochloric acid solution of 22° Bé. If a more concentrated hydrochloric acid solution is used, then a more concentrated acetic acid product may be obtained, but the yield and quality of the product will not be so good. If a more dilute hydrochloric acid solution is used the yield and quality of acid may be improved, but the acetic acid product will be less concentrated. The extent to which the direct steam distillation is carried may also be varied to modify the results. In general, the more extensive is the direct steam distillation the better are the yields and the more dilute is the product and vice versa. It will thus be seen that the invention is not limited to the use of any particular concentration of acid or to the production of any particular concentration of product, but that it is based upon the general proposition of using sufficient water in the reaction mixture to permit substantially complete reaction, distilling the reaction mixture in a plurality of stages of which an earlier stage is effected by indirect heating and the final stage involves steam distillation, and collecting a plurality of distillate fractions, the stronger of which is the final product of the process and the weaker of which is returned to the process and serves as the reaction vehicle.

In distilling the mixture of acetate of lime, hydrochloric acid, acetic acid and water and their reaction products as described above, a small amount of hydrochloric acid sufficient to seriously contaminate the acetic acid product may distil along with the acetic acid. In order to prevent the hydrochloric acid from entering the acetic acid product the gases leaving the still and consisting essentially of acetic acid, water and a small amount of hydrochloric acid are passed through a scrubber in which the scrubbing liquid is a solution of calcium acetate and acetic acid in water held at about its boiling temperature. The concentration of acetic acid in the scrubber liquid should be about the same as the concentration of the acetic acid distillate being scrubbed, and the liquid should be maintained at or near its boiling temperature to prevent absorption of acetic acid in the scrubbing liquid. The scrubbing liquid absorbs hydrochloric acid from the distillate, forming calcium chlorid and acetic acid by reaction with the calcium acetate content of the scrubbing liquid. When the scrubbing liquid becomes ineffective or exhausted it is added to a batch of calcium acetate and hydrochloric acid in the still, and a new solution of calcium acetate and acetic acid is supplied to the scrubber.

The scrubbing of the distillate need be applied only to the distillate which is collected as final product, because the presence of hydrochloric acid in the weak acetic acid distillate which is returned to the process is not objectionable. However, it is sometimes preferred to use the scrubber for both distillations to avoid corrosion of the condenser that might be caused by the presence of hydrochloric acid in the weak acetic acid distillate.

I claim:

1. Process of making concentrated acetic acid solution which comprises, mixing a strong mineral acid, a salt of acetic acid, and a dilute solution of acetic acid, distilling the mixture, and collecting the distillate in the earlier stage of the distillation separately from the distillate in a later stage of the distillation.

2. Process of making acetic acid which comprises distilling a mixture formed by mixing hydrochloric acid gas, calcium acetate, and a dilute solution of acetic acid in water, collecting the concentrated acetic acid solution distilled in the first part of the distillation, separately collecting the dilute acetic acid solution distilled in a later part of the distillation, and using said dilute acetic acid solution for mixing with calcium acetate and hydrochloric acid gas for a subsequent distilling operation.

3. Process of making acetic acid which comprises, preparing a mixture of calcium acetate with a strong mineral acid in quantity sufficient to liberate all of the acetate component of the calcium acetate in the form of acetic acid and water in quantity sufficient to permit the complete liberation of said acetate component as acetic acid, distilling said mixture in at least two stages, collecting dilute acetic acid in the later stage of the distillation containing water in quantity sufficient for the preparation of a second mixture similar to said first-named mixture, and distilling said second mixture.

4. Process of making acetic acid which comprises successively distilling batches formed by mixing calcium acetate, hydrochloric acid gas and a solution of acetic acid in water, collecting concentrated acetic acid from the first part of the distillation of each of said batches, separately collecting dilute acetic acid solution from the later part of the distillation of each of said batches, and using the dilute acetic acid solution from the distillation of each of said batches for the preparation of each batch successively distilled.

5. Process of making acetic acid which comprises, mixing calcium acetate, hydrochloric acid gas, and water, distilling the mixture, scrubbing the distillate with solution containing calcium acetate, collecting separate fractions of concentrated acetic acid solution and dilute acetic acid solution, and using said dilute acetic acid solution in a succeeding repetition of the foregoing procedure.

6. Process of making acetic acid which comprises, partially distilling the acetic acid content of a mixture formed by mixing calcium acetate, hydrochloric acid gas and water by indirectly heating said mixture, collecting a relatively concentrated acetic acid solution during said distillation, completing the distillation of the acetic acid content of said mixture by indirectly heating the same and blowing live steam therethrough, and separately collecting a relatively dilute solution of acetic acid while completing the distillation.

7. Process as defined in claim 6 in which the mixture subjected to distillation contains hydrochloric acid in quantity sufficient to liberate the acetate component of the calcium acetate in the form of acetic acid and water sufficient to permit said liberation of acetic acid in the mixture.

8. Process as defined in claim 6 in which the water content of the mixture is supplied in the form of a dilute acetic acid solution from a previous distilling operation.

9. Process as defined in claim 6 in which the water content of the mixture is sufficient to permit the substantially complete liberation of the acetate component of the calcium acetate in the form of acetate acid, and the distillation with direct steam is applied only for such a period that the dilute acetic acid solution so produced shall be sufficient in quantity to supply the water required for the preparation of a similar mixture for a subsequent distillation.

In testimony whereof, I affix my signature

HENRY HOWARD